Figure 1:
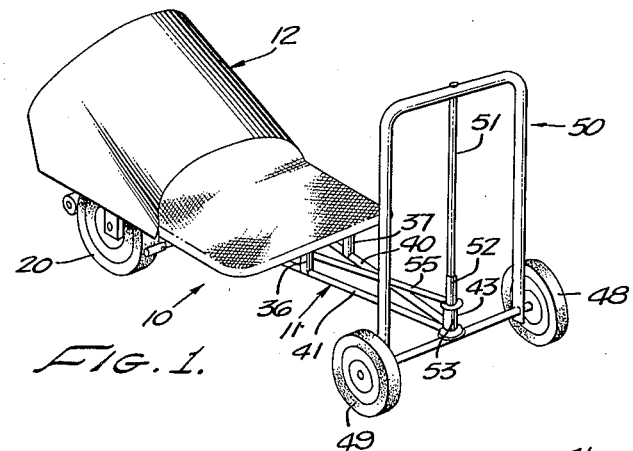

Nov. 17, 1964        J. W. SELLNER        3,157,243
VEHICLE STEERING AND DRIVE MEANS
Filed Dec. 13, 1961        3 Sheets-Sheet 1

JOHN W. SELLNER
INVENTOR.

BY
ATTORNEY

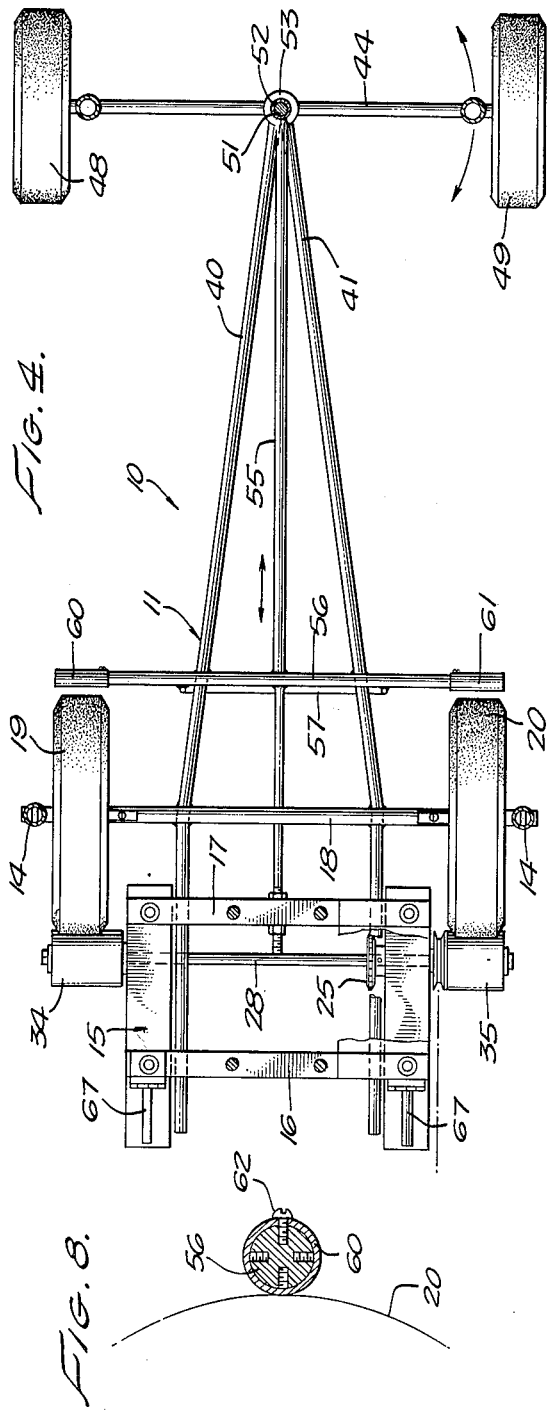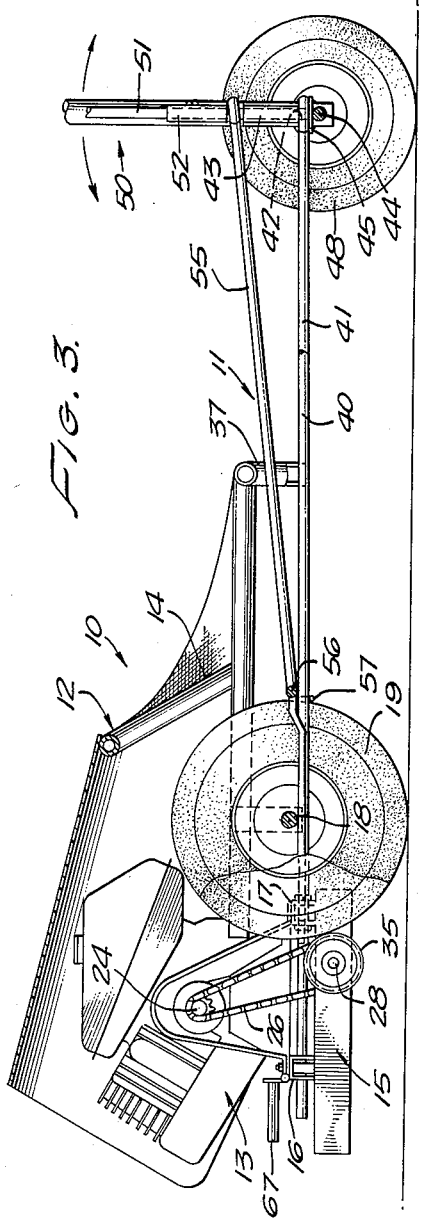
JOHN W. SELLNER
INVENTOR.
BY
ATTORNEY

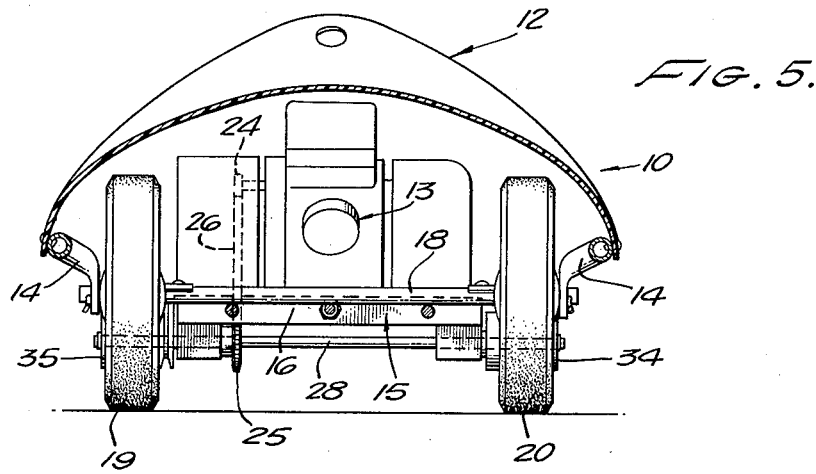
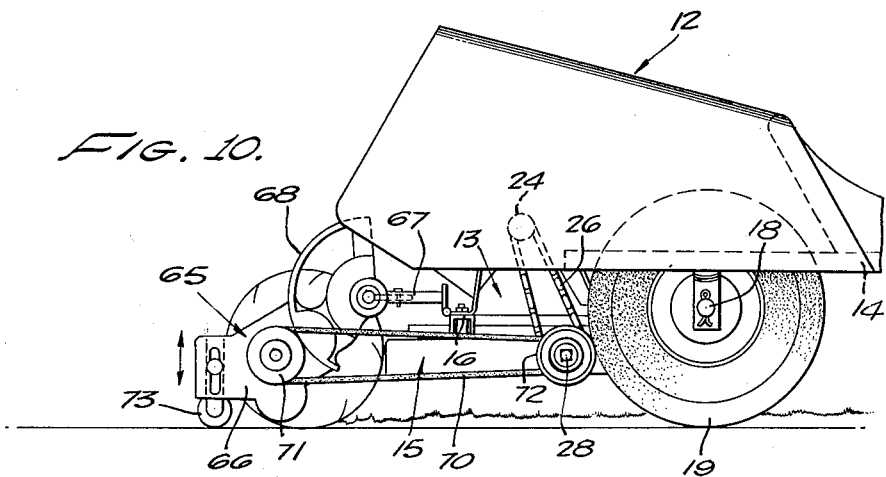
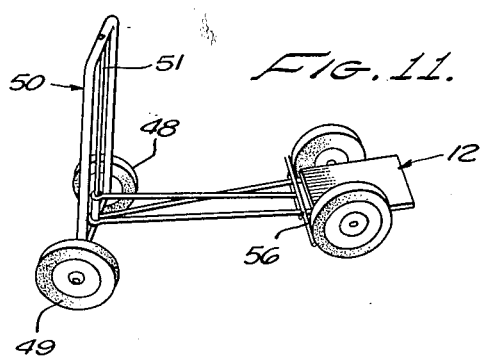
JOHN W. SELLNER
INVENTOR.
BY
ATTORNEY

United States Patent Office 3,157,243
Patented Nov. 17, 1964

3,157,243
VEHICLE STEERING AND DRIVE MEANS
John W. Sellner, 7777 San Fernando Road,
Sun Valley, Calif.
Filed Dec. 13, 1961, Ser. No. 159,186
3 Claims. (Cl. 180—77)

This invention relates to improvements in steering and/or drive means for a vehicle, preferably and more particularly a vehicle adapted for usage by a child, but not limited thereto. The invention may be applied in various forms of vehicle which may take the form of a species of "kiddie cart" or a powered car or "runabout."

The improvements in the assembly, as stated, lie principally in the control means for the car or vehicle. The control means for steering, clutching and braking, in the powered version of the invention, are embodied in a single unitary control column or member. This single member or column is manipulatable to turn right or left and is itself also manipulatable to effect clutching, declutching, braking and release of the brakes.

The improvements, as stated, are applicable in forms of the invention which are not powered, with the difference that in such instance there being no power, there is, of course, no clutching or declutching action.

In a preferred form of the invention, the steering member or column may take the form of an inverted yoke having an upright central stem or rod mounted to allow swiveling movement of the control member which is arranged to turn the front wheels of the vehicle to the left or right. The control member or yoke is also mounted for back and forth movement, that is angular or rotational movement about the axis of the front wheels. Simplified braking means are provided cooperating with the rear wheels which are actuatable by pulling backward on the control yoke. Simplified clutching means are provided for engagement with the rear wheels which are actuatable in clutching direction by pushing forward on the yoke. Accordingly, clutching, declutching, braking and release of the brakes can be effectuated as desired by proper manipulation of the control member or yoke while steering can be effected at the same time.

The primary object of the invention is to provide simplified, efficient, dependable, and economical means for realizing and providing the improvements set forth in the foregoing.

Another object of the invention is to provide a form of powered vehicle having simplified clutching and braking means, and having a single manually actuatable control member so arranged that the said member is able to accomplish steering, clutching, declutching, braking and release of the brakes. A corollary to this object is to achieve a means as stated, which by a single movement of the control member or column will effect clutching and release of the brakes and a single movement of the control member in the opposite direction will effect declutching and braking, while the control member is at the same time manipulatable for steering.

Figure 9:
Figure 7:
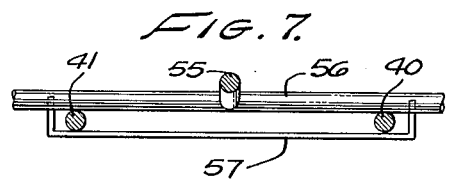
Figure 2:
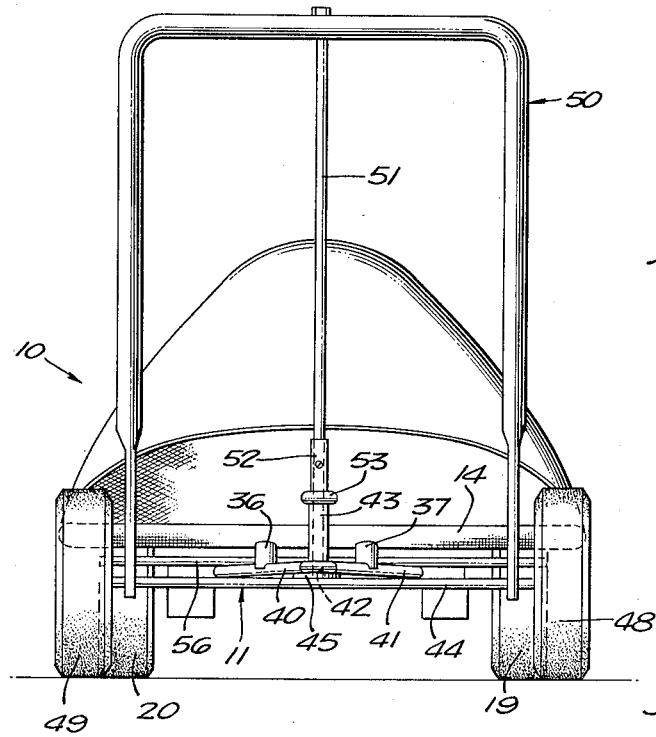
Figure 6:
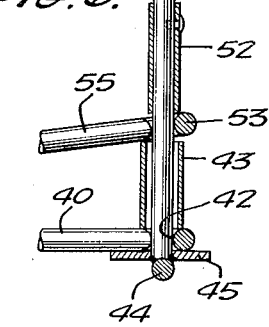

Further more detailed objects and advantages of the invention will become apparent from the following detailed description and annexed drawings wherein:

FIGURE 1 is a perspective view of a preferred form of the invention;
FIGURE 2 is a front view of the vehicle;
FIGURE 3 is a side view of the invention, partly in section;
FIGURE 4 is a plan view;
FIGURE 5 is a rear view;
FIGURE 6 is a detail view of the control column;
FIGURE 7 is a detail view of the brake member;
FIGURES 8 and 9 are detail views;
FIGURES 10 and 11 are views of modified forms of the invention.

Referring now in more detail to the drawings, numeral 10 shows a preferred form of vehicle assembly having a frame structure 11. The rear frame structure supports a horizontal platform 12 forming a seat and housing held by tubular frame 14. Supported by it also in a suitable manner is the driving motor 13 which may be a small gas engine of known type supported on frame 15 which slides on end extensions of frame 11, which extend relatively slidably through openings in transverse frame members 16 and 17 of frame 15. Journalled on ends of an axle 18 are the rear wheels 19 and 20.

On the shaft of the motor is a sprocket wheel 24 which drives another sprocket wheel 25 through a link chain 26. The sprocket wheel 25 is on a shaft 28 journalled in suitable bearings in the frame 15 as shown. On the ends of the shaft 28 are rollers 34 and 35 which are in a position adjacent to the rubber tires on the rear wheels 19 and 20. The shaft 28 is mounted in frame 15 so that the rollers 34 and 35 can be moved into and out of engagement with the rear wheels, that is, into clutching and declutching positions.

The frame 11 has forwardly extending members 40 and 41 under uprights 36 and 37 which come together at the front part of the vehicle forming an opening 42 to receive a tubular bearing member 43 having flange 45 and upstanding from the front axle 44. Front wheels 48 and 49 are mounted on the front axle 46.

Numeral 50 designates a control column or member for steering, clutching and braking. In the form shown, this member is an inverted U-shape with the ends of the legs connected to the front axle 44 inside the front wheels. The control member has a central rod or stem 51 having sleeve 52 and which extends downwardly through the tubular member 43 so as to allow swiveling movement of the control member to turn the front axle and front wheels to the right or left. The tubular member 43 has a swivel mounting in the opening 42 at the front end of the frame members 40 and 41 to allow angular fore and aft movement of the yoke or control member 50.

Connected to the upright 51 by loop 53 is a connecting link or rod 55 which extends rearwardly and is connected to a transverse braking rod 56 having guide frame 57 which engages the forwardly extending support members 40 and 41 so that the braking rod is limited to fore and aft sliding engagement therewith for braking and release of the brakes, the ends of this rod being engageable with the rubber tires on the rear wheels for braking. On the ends of the rod are friction members 60 and 61 attached as by screws 62 so that they can be rotated and reattached as wear occurs.

The rod 55 is also connected to the frame 15 which carries the rollers 34 and 35. It may be seen, therefore, that as the control member or yoke is pulled backward it acts through the rod 55 to bring the braking rod into engagement with the rear wheels and to move the rollers 34 and 35 in declutching direction, that is, away from the rear wheels. Movement of the steering column or member in the forward direction releases the brakes and moves the rollers 34 and 35 in clutching direction, that is, into engagement with the wheels. As stated, preferably the driving motor is of a constant speed type being provided with a governor so that the entire control is by way of the manual control member or yoke.

In another form of the invention, the driving motor or power means may be omitted as shown in FIGURE 11, in which case the vehicle or cart may be manually pushed or may be operated by the operator's feet straddling the frame of the structure. The assembly is otherwise the same except for the clutching and declutching member being omitted, the braking means otherwise operating the same and the steering being similarly effected.

FIGURE 10 shows a form of the invention with a lawn mower 65 fastened to the rear as an attachment. It has frame 66 mounted from extensions 67 attaching to a wheel axle. Wheel 68 has been cut away leaving the remaining part as a guard. The lawn mower rotor or reel is driven by belt 70 operating over pulleys 71 and 72. Numeral 73 designates a rear support roller.

From the foregoing, it will be observed that the invention provides a simplified, safe and dependable device which may be either manually powered or may be driven by power means. The control of the car or vehicle is extremely simplified and easy in that all operations are manually effected by a single control member, preferably in the form of a yoke, although it could have other shapes or configurations. This member is simply manipulated to right or left for turning in those directions and is pushed forward for forward motion and pulled back for slowing down and/or stopping. These motions of the control member, as described, simultaneously effect the release of the brakes and clutching for forward movement, and simultaneously effect braking and declutching for slowing down or stopping so that virtually no training, skill or experience is required by a child in order to operate the vehicle. In these respects the concept, combination and assembly are novel and provide a very useful, pleasurable and entertaining type of device or vehicle for use by children or for other equivalent uses.

The foregoing disclosure is representative of preferred forms of the invention and is to be interpreted in an illustrative rather than a limiting sense, the scope of the invention to be in accordance with the claims appended hereto.

What is claimed is:

1. In a wheeled vehicle, in combination, a frame, a wheel assembly including at least one rear wheel, a wheel assembly including at least one front wheel, said front wheel having an axle, means comprising a control column including an upright member connected to said front wheel assembly, mounting means for said upright member providing for pivotal movement of the said control column whereby the front wheel assembly, including the said axle, may be swiveled for turning the vehicle, said mounting means having means providing for fore and aft swiveling movement of said upright member about an axis which is substantially the axis of said axle, said vehicle having power drive means mounted thereon, clutching means for said drive means, and linkage means connected between said upright member and said clutching means at a point whereby fore and aft swiveling movement of said upright member operates said clutching means.

2. A vehicle as in claim 1 including braking means and means whereby the said braking means is also operated by fore and aft movement of said upright member.

3. In a wheeled vehicle, in combination, a frame, a wheel assembly including at least one rear wheel, a wheel assembly including at least one front wheel, said front wheel having an axle, means comprising a control column including an upright member connected to said front wheel assembly, mounting means for said upright member providing for pivotal movement of the said control column whereby the front wheel assembly, including the said axle, may be swiveled for turning the vehicle, said mounting means having means providing for fore and aft swiveling movement of said upright member about an axis which is substantially the axis of said axle, a driving motor, a platform carrying said motor and mounted for fore and aft movement with respect to said vehicle, friction drive means and braking means carried by said platform on opposite sides of a rear wheel and means whereby the platform is movable by the control column.

References Cited in the file of this patent

UNITED STATES PATENTS

| | | |
|---|---|---|
| 193,919 | Bush | Aug. 7, 1877 |
| 797,448 | Metcalf | Aug. 15, 1905 |
| 937,211 | Holsman | Oct. 19, 1909 |
| 987,728 | Liwentaal | Mar. 28, 1911 |
| 1,598,124 | Evans | Aug. 31, 1926 |
| 1,638,781 | Nettles | Aug. 9, 1927 |
| 1,959,229 | Carter | May 15, 1934 |
| 2,616,725 | East | Nov. 4, 1952 |
| 2,686,571 | Horste | Aug. 17, 1954 |
| 2,691,421 | Swanson | Oct. 12, 1954 |
| 2,861,643 | Wald et al. | Nov. 25, 1958 |
| 2,978,052 | Siwek | Apr. 4, 1961 |

FOREIGN PATENTS

| | | |
|---|---|---|
| 176,514 | Great Britain | Mar. 8, 1922 |